Jan. 30, 1968   R. H. PARK   3,365,950
PRESSURE TRANSMITTER
Filed Sept. 3, 1965
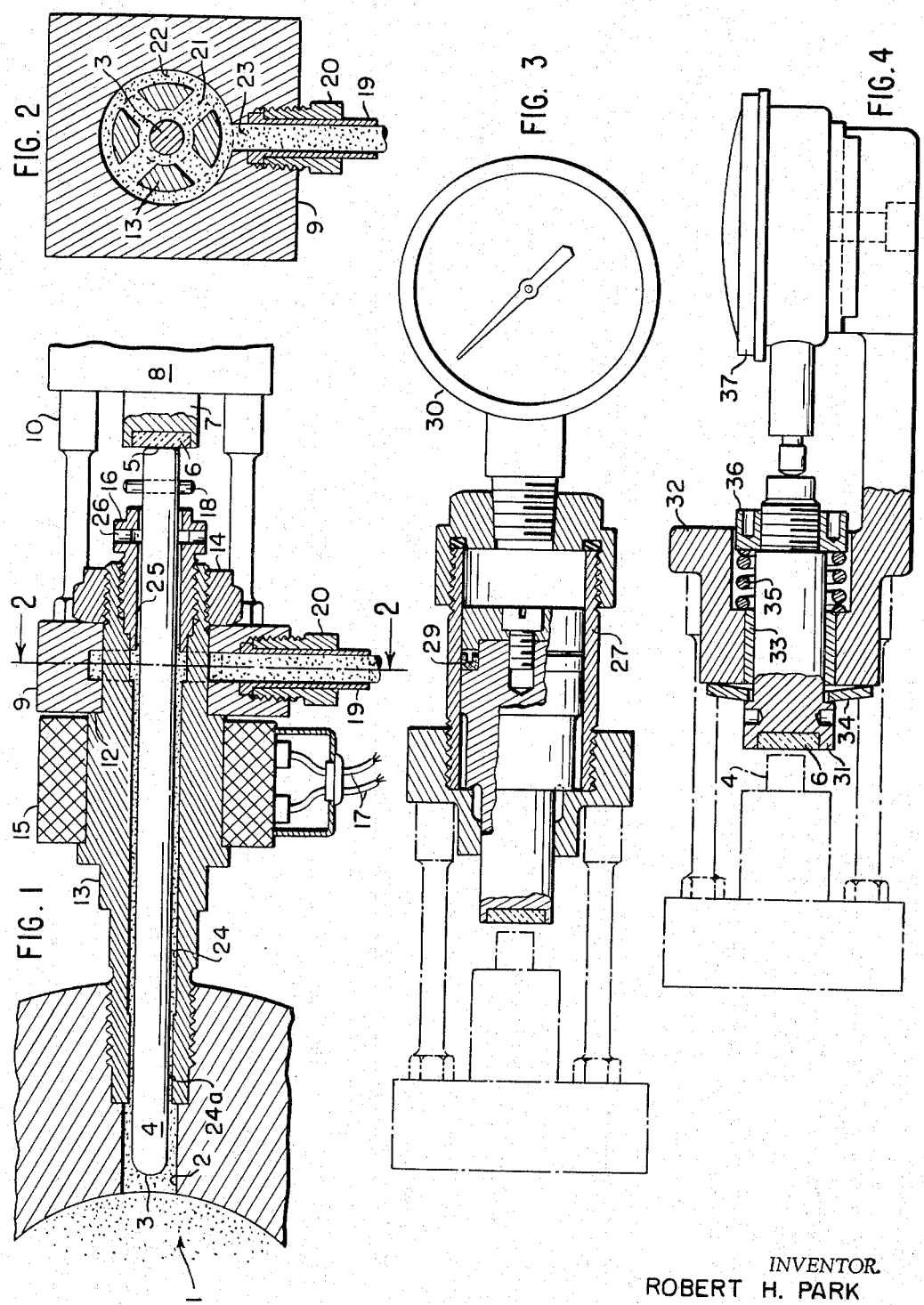
INVENTOR.
ROBERT H. PARK
BY
Kenway, Jenney & Hildreth
ATTORNEYS

United States Patent Office 3,365,950
Patented Jan. 30, 1968

3,365,950
PRESSURE TRANSMITTER
Robert H. Park, Corporation Road, Dennis, Mass. 02638
Filed Sept. 3, 1965, Ser. No. 485,035
9 Claims. (Cl. 73—419)

ABSTRACT OF THE DISCLOSURE

A pressure transmitter for indicating the pressure exerted by a mass of softened plastic which includes an axially movable piston in a conduit communicating with the plastic container, clearance being provided between the piston and the interior wall of the conduit to permit plastic to flow between the piston and conduit, the conduit having a bleed opening to divert plastic out of the conduit. A heater is incorporated to raise the temperature of the plastic at the bleed opening when increased temperature is required to maintain flow of the plastic.

---

This invention relates in general to measuring and controlling the pressures of thermoplastic materials and in particular to the measurement and control of pressures such as are developed in processes of extrusion, injection, and like operations on heated and melted or softened plastic.

Knowledge of pressures and the control of pressures in thermoplastic extrusion apparatus has proven to be essential to efficient and trouble-free operation. This is equally true both ahead of the breaker plate and screen pack and beyond the breaker plate as well. In the former case, information is needed as a basis for utilizing control devices which are responsive to thrust bearing loads and in the latter case, information on extrusion system pressures is needed to facilitate control of plastic flow, the thickness of plastic film or sheet, or of insulation being applied to wire or the like. Moreover, future developments will undoubtedly require more accurate pressure data and more precise pressure control in thermoplastic injection processes.

Methods of determining pressures of heated plastic heretofore used include:

(a) Transmission of pressure of heated plastic to a grease filled Bourdon tube gauge, or other hydraulic pressure measuring device, by means of a grease filled conduit connected between the gauge and the point at which plastic pressure is to be determined;

(b) Transmission of a force exerted by heated plastic on a first diaphragm via a tubular member, to which the diaphragm is attached at one end, and which encloses a rod which bears on the diaphragm and accepts most of its load, there being provided at the end of the tubular member distant from the first diaphragm a further diaphragm or other support member and strain gauge or other transducer means for deriving an electrical or other signal output related to the force communicated to the rod by the diaphragm, and via the rod to the transducer;

(c) Transmission of force, via a first piston fitting closely within a hole within a heated wall enclosing pressurized plastic, to a second piston running within a grease filled cylinder attached to the heated wall as by two or more legs, or otherwise, and employment of an oil pressure gauge to measure the grease pressure developed within the said cylinder.

In the first of the above-described measurement methods, there is the hazard of entry of plastic into the communication conduit and/or gauge or other hydraulic pressure measuring device resulting in plugging and consequent gauge failure. Furthermore, there is the risk of contamination of plastic with grease.

The second method is subject to the disadvantage that the first diaphragm may be deformed, especially under the shock of extruder start-up or temperature variation. Deforming of the first diaphragm affects the force applied to the rod and hence can result in diaphragm fatigue and ultimate failure.

The third method avoids most of the previously mentioned difficulties, and by replacing the oil gauge by a suitable transducer, one can derive electrical signals proportional to plastic pressure.

However, certain problems remain even in connection with the third approach outlined above. By way of example, if the fit of the first piston is initially such as to allow free piston motion, but so close as to unduly retard plastic flow in the annular space around the piston, the plastic within this space will in time tend to degrade and form sticky, tarlike residues, which act to impede free piston motion and also to further retard plastic leakage, thus further impeding free piston motion and causing errors in pressure indication.

In certain applications, plastic leakage or bleed can be made small enough to be unimportant in respect to material loss, and relatively free piston motion can be temporarily retained. However, even a small bleed can, in time, build up and harden around the exterior head of the first piston and by contact with the cylinder or the cylinder support element act to exert force on one or the other piston, thereby causing errors in pressure indications. Also, particularly on start-up of an extruder, there may be a lag in temperature build-up of parts which can act to accentuate these effects.

On the other hand, in certain types of plastic processing operations, the plastic within the heated wall of the processing device is held at a temperature great enough to reduce plastic viscosity to a relatively low value. In this situation, even with the least clearance that is consistent with free motion of the first piston, plastic bleed may be great enough to cause considerable inconvenience in relation to disposal and even in relation to cost of material lost by bleeding, beyond which errors due to cooling and hardening of bleed out material can occur.

Thus, in the used of method (c), the following problems either have been encountered or may be anticipated:

(a) The motion of the pistons utilized is impeded either by tar formation or by the effects of congealed plastic.

(b) Suitable disposition of plastic bleed is difficult or inconvenient.

(c) Excessive plastic bleed occurs.

My invention has as its primary object the avoidance of the difficulties outlined.

To accomplish this object and to further improve plastic operations, I provide a suitably heated plastic conduit means, which is screwed into, or otherwise attached to, the heated wall enclosing the plastic that is being processed. Within the conduit there is fitted a pressure transmitting piston in the form of an axially movable rod. The rod is spaced from the inside wall of the conduit and, where preferred cylindrical configurations are used, the space is annular. The annular space may be varied along its length, which is preferably accomplished by providing steps on the inside of the conduit. Generally, however, at the end remote from the reservoir the piston closely fits the conduit. The annular space may be restricted adjacent the reservoir or at any point between the reservoir and the other end of the conduit. Enlarged annular areas may be provided at a point or at spaced points to communicate with radial bleed channels. Provision is made to control the temperature of the annular zones and the length and thickness of the zones, which are not necessarily uniform, are suitably chosen in relation to the controlled temperature to cause plastic to flow from the point of plastic melt pressure determination, at a controlled rate, through the annular region and to be diverted at the bleed point radially through the conduit wall. More than one annular zone may be provided and additional radial bleeds may be used. Generally, however, the plastic which flows in controlled amount through the annular region is caused to flow through a primary bleed channel and freely emerge from the conduit. Where two or more annular zones are involved, flow through further zones and bleeds is usually limited or even non-existent.

In the process, I also control the annulus dimensions so as to minimize primary plastic bleed, but in doing so, I also make certain that bleed occurs fast enough to prevent deposition of tarry residues that could impede piston motion. Moreover, in relation to the force measuring means utilized to respond to piston motion induced by changes in plastic melt temperature, I provide an annular spacing which is not so close as to unsuitably slow down rate of piston motion and consequent force indication in response to plastic melt pressure variation relative to whatever rate of response may be desired under any particular conditions of use. Finally, for parts which come in contact with plastic, I employ materials of construction which are relatively inactive as catalysts of plastic degradation and which themselves resist corrosive attack.

My invention is adapted for use with strain gauge and other small displacement inherently high natural period, force transducing systems, and therefore can be utilized when it is desired to employ such devices. For example, it is of great value in providing data on rapidly changing components of plastic melt pressures, utilizing such relatively delicate devices as mentioned. Yet, it is also possible, and in many applications desirable, to utilize my invention in more rugged and less expensive and complicated transducing systems, such as oil or grease filled cylinders coupled to pressure gauges, or dial gauges reading the motion of spring members.

Accordingly, it is another object of my invention to provide a force transmitting device which is adapted for use in systems for measuring plastic melt pressures and which offers advantages in respect to the reliability, ruggedness, and low maintenance, and/or cost of such systems.

Other objects and advantages of my invention will become apparent from the following detailed description taken in conjunction with the accompanying drawings, wherein:

FIG. 1 is a sectional view of a pressure transmitter mounted on a hollow plastic enclosing structure;

FIG. 2 is a cross-sectional view of a portion of the transmitter taken along the line 2—2 in FIG. 1;

FIG. 3 is a view of a form of hydraulic pressure indicator useful with the transmitter of FIG. 1; and FIG. 4 is a view of another indicator of mechanical structure useful in the transmitter of FIG. 1 as detached from the structure.

Referring now to FIG. 1, a reservoir of heated and softened or melted plastic 1, has an opening 2 formed in its wall which constitutes a cylindrical passage. The plastic exerts pressure on a face 3 of a piston 4. The face 3 is shown as being rounded to avoid tar deposit. However, in most applications the face 3 may be square without causing any difficulty. At the other end of the piston 4, is a second face 5 shown as pressing against a thermally isolating pad 6 which may be inserted in or otherwise held in position in the end of the terminal element 7 of a force transducer system 8. In certain situations, where it is desired to transmit heat to the element 7, the thermally isolating pad 6 may be eliminated and the face 5 can bear directly upon the element 7.

A force transducer system 8 is attached to a bleed plate 9 by means of screws (not shown) threaded into studs 10.

The studs 10 are preferably made of 18–8 stainless steel and of centrally reduced cross-section with a view to reduction of heat transfer to, and temperature of, the transducer 8. As material for thermally isolating pad 6, automobile brake lining has been found suitable.

A tubular conduit 13 is screwed into the opening 2 and the piston 4 is enclosed along much of its length by the conduit 13 and the opening 2. The bleed plate 9 is held by a nut 14 in mechanical and thermal contact with a shoulder 12 formed in the conduit 13. Heat is imparted to the conduit member 13 by an electrical band heater 15 which may be of any conventional type but is here shown as of the ceramic type generally as described in U.S. Patent No. 2,549,944 and which is supplied with current from a controlled power source via leads 17. The supply of current is suitably controlled, as either by means of variable transformer, or, where desirable, by employment of a thermostat or any suitable temperature control means (not shown) which is made to be responsive to the temperature of either the conduit 13 in the vicinity of the heater 15 or to the temperature of the plate 9.

As is explained in greater detail below, it is desirable that a close fit be established between the piston 4 and the inner wall of the tubular conduit 13 at its end remote from the reservoir of heated plastic. Such a fit may be had by suitably machining the piston and conduit, or, a gland 16 may be screwed into the conduit. A pin 18 passing through the piston may be used to prevent accidental entry of the piston into the plastic reservoir by contacting the end of the gland or the conduit, as the case may be.

In the embodiment of the invention shown in FIG. 1, three annular zones are shown, namely the zone 24a about the piston adjacent the reservoir, an enlarged flow zone 24, and the zone 25 about the piston adjacent the end remote from the reservoir. Employment of the enlarged zone 24 offers the advantage that the rate of bleed is governed primarily by the clearance at zone 24a, and is not critically dependent on the temperature maintained in the zone 24 or the bleed region. In some circumstances alternative zones and bleed regions are desirable: for example, when measuring the pressure of a relatively fluid plastic, the annular zone of restricted length adjacent the plastic reservoir may be advantageously replaced by a zone of uniform annular spacing extending all the way from the reservoir end of conduit 13 to the point of bleed, thereby to provide a flow control zone which can be held at a controlled lower value than the temperature of the reservoir, with a view of restricting rate of bleed. In such an arrangement it may also be advantageous to somewhat restrict the annular flow path adjacent the bleed point.

A tubular element 19 is held in place in the bleed plate 9 by a hollow plug 20, as best seen in FIG. 2. In operation, heated plastic 1 within the conduit 2, besides pushing on the face 3 of the piston 4, also tends to flow slowly in the interface between the piston 4 and the inner wall of the opening 2 and the conduit or housing 13. The interface, as noted, may be constituted by one or more annular zones around the piston through which the plastic flows until it reaches the gland 16. Then, the plastic tends to be diverted through radial openings 21 to a further annular opening 22 from which point it passes through the radial opening 23 in the bleed plate 9 into the discharge element 19 and, via this element, out into the adjacent air space.

In the case of blow molding operations with polyethylenes, suitable adjustment of the temperature of the conduit 13 and the bleed plate 9, together with provision of a suitable clearance about the piston 4 in the annular zones 24 and 25, can prevent or reduce to negligible proportions any flow of plastic through the gland 16.

With certain other plastics, such as nylon for example, bleed tendency can be expected to increase, due to narrow melt temperature range. With such materials, it may be desirable to provide a further bleed connection of the type shown at 26 in the gland 16 to divert any minor quantity of plastic that may flow through the gland 16. The material will then be prevented from leaking out of the exterior end of the gland and exerting forces on the pin 18 and/or on the pad 6 and the piston 7.

Other considerations arise when a plastic like polyvinyl chloride is being used. A faster bleed is necessary because polyvinyl chloride tends to decompose rapidly and its degradation characteristics cause rapid carbonization. In a typical application, a primary bleed zone of as much as .006″ to .008″ clearance providing a bleed as great as an inch per hour at normal operating temperatures may be desirable.

Some flow of plastic appears to be always necessary to prevent formation of adherent tars which, in the absence of plastic flow, form, in time, and impede free motion of the piston 4. As is plain from the examples cited above, the size of the annulus 24 and the desirability of stepped annular zones depend upon several factors including viscosity or "fluidity" of the product at operating temperatures. Of course, the piston in any case is closely fitted to the conduit 13 or to the gland 16 at the end remote from the reservoir of heated plastic. Speed of movement of the piston 4 in response to a change in plastic pressure to avoid lag in pressure indication also affects the choice of clearance or annulus size. Thus, in addition to the type of plastic and the temperature, other conditions of use, including the type of force transducer used require consideration. Still another determining factor is, of course, whether there is interest in only slowly changing components of plastic pressure, or in rapidly changing components, if any.

In general, therefore, precise clearance at annular zones, such as zones 24a and 25 has to be determined by experience. However, for certain blow molding operations with polyethylene, I have found that, where an oil filled cylinder and oil pressure gauge are used as a force transducer, and the objective is to determine pressure changes that occur when an extruder is started and stopped cyclically, diametral clearance of .002″ to .003″ at both zones 24a and 25 and clearance at zone 24 of 3/32″ afforded a satisfactory result. With such clearance, and with the temperature of the bleed plate 9 held at about the temperature of the structure 2, bleed may typically take place at a rate of 1/16 to 1/4 inch per hour.

In the extrusion of polyethylene, parts in contact with plastic may be made of stainless steel. Parts in sliding contact are preferably hardened and, by way of example, the piston 4, the conduit 13 and the gland 25 may be made from 17-4 PH steel.

Situations arise in which it is necessary to employ a long conduit 13 and thereby run a risk of the plastic becoming unduly cooled at points distant from the ends. It then may be desirable to use hardened beryllium copper as a preferred material of construction.

As known to those skilled in the art, the desirable type of material of construction will in general depend on the type of plastic being processed. However, the principle will apply generally that materials should be selected which tend to minimize plastic degradation, as well as metal wear and corrosion, while also due consideration needs to be given to maintaining adequate temperature along the total length of conduit 13.

While not shown, it will be evident that, if need be, loss of heat from the central portion of a conduit 13 of extended length can be overcome. Thermal insulation may be applied externally and/or the conduit may be enclosed in a tubular metal element of good thermal conductivity which is arranged to draw heat either from one or the other end of the conduit, or from an individual or auxiliary sources of electric heat. Of course, thermostatic or other heat controlling devices may also be employed.

With respect to measuring the force on piston 4, as is well known to those skilled in the art, a variety of forms of force measuring transducers in which force is converted into an electrical quantity that can be read on a meter, recorded on a chart, or caused to actuate a control device, are available commercially. See, for example, an article, "Electronic Die-Pressure Control Holds Key to Quality Extrusion," by Glenn A. Pettit and Ray L. Eckman, published in the May 1964 issue of "Plastics Technology."

In addition to such transducers, simpler types, shown in FIGS. 3 and 4 and described hereinbelow, may also be used.

FIG. 3 shows a hydraulic cylinder 27 fitted with a piston 28 having a U-cup packing 29 and a gauge 30. The cylinder is filled with oil or grease, after preferably first bleeding out any trapped air, and acts as a plastic pressure-to-oil (or grease) pressure transducer, wherein the ratio of plastic pressure to gauge pressure will be given to a first approximation by the quantity:

$$\left( \frac{\text{Internal dia. of of cylinder}}{\text{dia. of piston } 4 + \tfrac{1}{2} \text{ diametral clearance of piston in annulus } 24} \right)^2$$

Thus, in a cylinder of 1 inch bore, if a pressure ratio of 10 is desired, and diametral clearance of piston 4 is .002 inch, then the diameter of the piston 4 should be chosen equal to $$1/\sqrt{10} - .001 = .315$$

while the bore of the annulus should be chosen equal to $$.315 + .002 = .317$$

Also, FIG. 4 is a view of a mechanical transducer system wherein a headed rod 31, having in the head a thermally isolating pad 6 receives thrust from the transmitter piston rod 4. The rod 31 is journaled in support structure 32 by a bearing 33, and is caused to press against a Belleville spring 34 by a coil spring 35 which bears against a threaded spanner nut 36.

In use, the piston 4 pushes on the pad 6 and causes deflection of the spring 34 which results in motion of the rod 31. The motion is detected by a dial type gauge 37, which, for accurate reading, is furnished with a slightly non-uniform scale to compensate for the deflection of a Belleville spring which does not have an entirely linear relation to applied force. Of course, alternative spring arrangements may be used with properly chosen gauges.

It will further be recognized that the arrangement of FIG. 3 can be used as a control device by providing a type of commercially available gauge incorporating an internal switch actuated as a presettable pressure or by providing a T between the gauge and the cylinder and tapping off an oil line which can be connected to one or more oil operated switches such as are widely available commercially and well known in the art.

Similarly, if desired, in the arrangement of FIG. 4, a known contact-making type of dial gauge such as is commercially available can be used in place of a conventional gauge, whereby to facilitate accomplishment of control functions.

While I have not as yet experimented with the full range of plastics or types of transducers, it is my belief that the basic concept of providing controlled bleed as in the device that I have shown for the measurement of pressure is applicable to practically all known types of thermoplastic and, also, is adapted for use in relation to the performance of a variety of control functions.

Also, in this connection, I recognize that desirable clearance and temperatures will vary in relation to type of plastic, plastic temperature, type of force transducer, and type of measurement or control used.

Therefore, while the present invention has been described in conjunction with selected embodiments, it is to be understood that modifications and variations may be resorted to without departing from the spirit and scope of the invention, as those skilled in the art will readily understand. Such modifications and variations are con-

I claim:

1. In a pressure transmitter for indicating the pressure exerted by a mass of softened plastic contained within a reservoir, the combination of a conduit comunicating with said reservoir, a piston mounted for axial movement within said conduit, said piston extending through said conduit at the end thereof remote from said reservoir and being of smaller outside diameter than the inside diameter of said conduit to provide sufficient clearance for a predetermined flow of plastic along the interface of said piston and said conduit, a bleed opening being formed in and substantially radially of said conduit at a point intermediate of the ends thereof to divert the flow of plastic from said interface to the exterior of said conduit.

2. In a pressure transmitter for indicating the pressure exerted by a mass of softened plastic contained within a reservoir, the combination of a cylindrical piston and a cylindrical conduit communicating with said reservoir, said piston having an outer diameter less than the inner diameter of said conduit to provide spacing therebetween, said spacing for at least a part of the length of said conduit being sufficient to permit predetermined flow of plastic therethrough, and said conduit having a radial opening formed therein at a point in said part of its length to permit the flow of plastic out of said conduit.

3. In a pressure transmitter for indicating the pressure exerted by a mass of softened plastic contained within a reservoir the combination of a cylindrical piston, a cylindrical conduit communicating with said enclosure, said piston being mounted for axial movement within said conduit and being spaced from the interior wall of said conduit by a given amount for at least a part of its length, means for maintaining said conduit at a temperature above that at which said plastic flows, at least one portion of said conduit having a radial opening formed therein to provide an outlet from said conduit for said plastic.

4. In a pressure transmitter as defined in claim 1, the combination with said conduit of a heater for maintaining said conduit at a temperature above that at which said plastic flows.

5. In a pressure transmitter for indicating the pressure exerted by a mass of heat-softened plastic contained within a heated reservoir upon a cylindrical piston mounted for axial motion within a cylindrical conduit communicating with said reservoir, the combination which includes means forming a radial plastic bleed zone intermediate the ends of said conduit, said conduit having an interior wall spaced relatively closely to said piston in a first region adjacent said reservoir and spaced relatively distantly from said piston at points along said conduit between said first region and said radial plastic bleed zone.

6. In a pressure transmitter for indicating the pressure exerted by a mass of softened plastic contained within a reservoir, the combination of a cylindrical conduit communicating with said reservoir, a cylindrical piston disposed for movement coaxially of and within said conduit, the outer diameter of said piston and the inner diameter of said conduit being so related that an annular flow zone is formed therebetween to permit a controlled flow of plastic therethrough, the inner diameter of said conduit wall and the outer diameter of said piston being so related that an annular clearance zone is formed beyond said flow zone, said conduit having at least a first radial opening formed therethrough at a point intermediate of said flow zone and said clearance zone to permit the flow of plastic out of said conduit.

7. Apparatus as defined in claim 6 wherein said conduit has a second radial opening formed therethrough at a point beyond said first radial opening to permit the further flow of plastic out of said conduit.

8. In a pressure transmitter for indicating the pressure exerted by a mass of softened plastic contained within a reservoir, the combination of a cylindrical conduit communicating with said reservoir, a cylindrical piston disposed for movement coaxially of and within said conduit, the outer diameter of said piston and the inner diameter of said conduit being so related that an annular opening is formed between said piston and said conduit to permit a controlled flow of plastic therebetween, said conduit having at least one enlarged area formed in the inner wall thereof at a point in communication with said annular opening, and said conduit wall having a radial opening formed therethrough in communication with said enlarged area to permit the flow of plastic from said conduit.

9. Apparatus as in claim 8 wherein said piston has an outer diameter and said conduit has an inner diameter along a portion of their length extending from said reservoir so related that said annular opening is restricted in size along said portion.

References Cited

UNITED STATES PATENTS 2,091,792   8/1937   Niesemann _____ 73—208
3,027,756   4/1962   Head _____ 73—54 XR DAVID SCHONBERG, *Primary Examiner.*

LOUIS PRINCE, *Examiner.*

D. O. WOODIEL, *Assistant Examiner.*